(12) United States Patent
Lin et al.

(10) Patent No.: US 11,654,661 B2
(45) Date of Patent: May 23, 2023

(54) COMPOSITE THERMOPLASTIC FILM AND THE MANUFACTURING METHOD THEREOF

(71) Applicant: SAN FANG CHEMICAL INDUSTRY CO., LTD., Kaohsiung (TW)

(72) Inventors: Chih-Yi Lin, Kaohsiung (TW);
Kuo-Kuang Cheng, Kaohsiung (TW);
Chi-Chin Chiang, Kaohsiung (TW);
Wen-Hsin Tai, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 0 days.

(21) Appl. No.: 17/688,039

(22) Filed: Mar. 7, 2022

(65) Prior Publication Data

US 2023/0001673 A1  Jan. 5, 2023

(30) Foreign Application Priority Data

Jul. 1, 2021 (TW) .................. 110124213

(51) Int. Cl.

| | |
|---|---|
| *B32B 27/08* | (2006.01) |
| *B32B 27/32* | (2006.01) |
| *B32B 27/40* | (2006.01) |
| *B29C 48/08* | (2019.01) |
| *B29C 48/21* | (2019.01) |
| *B29C 48/00* | (2019.01) |
| *B29K 75/00* | (2006.01) |
| *B29K 23/00* | (2006.01) |

(52) U.S. Cl.
CPC ............ *B32B 27/08* (2013.01); *B29C 48/002* (2019.02); *B29C 48/08* (2019.02); *B29C 48/21* (2019.02); *B32B 27/32* (2013.01); *B32B 27/40* (2013.01); *B29K 2023/00* (2013.01); *B29K 2075/00* (2013.01); *B32B 2250/24* (2013.01); *B32B 2270/00* (2013.01); *B32B 2307/536* (2013.01); *B32B 2307/54* (2013.01); *B32B 2307/5825* (2013.01); *B32B 2307/732* (2013.01)

(58) Field of Classification Search
CPC ..... B32B 27/08; B32B 27/32; B32B 2250/24; B29C 48/002; B29C 48/08
See application file for complete search history.

(56) References Cited

PUBLICATIONS

Miura et al (JP 2006335063) Dec. 14 (Year: 2006).*

* cited by examiner

*Primary Examiner* — Lawrence D Ferguson
(74) *Attorney, Agent, or Firm* — Muncy, Geissler, Olds & Lowe, P.C.

(57) ABSTRACT

A composite thermoplastic film and the manufacturing method are provided in the present invention. The method includes: providing a first structural layer and a second structural layer; performing a co-extrusion step to form a composite layer, in which to use a first extruding machine to perform the co-extrusion step, so the first structural layer is divided into a first thermal fuse film and a third thermal fuse film, and use a second extruding machine to perform the co-extrusion step, so the second structural layer is formed as a second thermal fuse film and disposed between the first thermal fuse film and the third thermal fuse film to form a composite layer; and performing a film-forming step, the composite layer is cooled to form a film through a forming wheel, and a rotating speed of the forming wheel can be controlled to acquire a desired thickness of the composite thermoplastic film.

8 Claims, 1 Drawing Sheet

COMPOSITE THERMOPLASTIC FILM AND THE MANUFACTURING METHOD THEREOF

CROSS-REFERENCE TO RELATED APPLICATIONS

This application claims priority under 35 U.S.C. § 119(e) to Taiwan Patent Application Ser. No.110124213, filed on Jul. 1, 2021, the entire contents of which are hereby incorporated by reference.

FIELD OF THE INVENTION

The present invention relates to a thermoplastic film, especially relates to a composite thermoplastic film and a manufacturing method thereof.

BACKGROUND OF THE INVENTION

Most materials of artificial leather used on chairs or chair cushions is polyvinyl chloride (PVC) or polyurethane (PU), however, manufacturing process of polyvinyl chloride is not environment-friendly and the material is not recyclable, which is easy environmental pollution. PU has the same problem as PVC. In addition, solvent is added in the manufacturing process of PU that will cause the environmental pollution of wastewater treatment and affect human health.

Conventional sheet materials such as polypropylene (PP), thermoplastic olefin (TPO), polyethylene (PE), polyvinyl chloride (PVC) and polyurethane (PU), which uses a vacuum blister device with upper and lower radiation heating, can be used as seat cushions, handlebars, plastic shells or accessories in the car.

The artificial leather in the conventional technologies needs to use adhesives, and the surface is made of PVC rubber or PU rubber for composite processing to make artificial leather, however, the drawback is that the manufacturing process is more complex, and the adhesives, PVC rubber or PU rubber is not environment-friendly and is not recyclable. In addition, when the PVC material is applied for seat cushions, especially the bicycle seat cushions, the PVC material is difficult to degrade and easy to disperse pungent odor, so the PVC material is not environment-friendly.

Furthermore, a conventional manufacturing process of PVC is formed by free radical polymerization of vinyl chloride monomer after peroxides, or exposed to light and heat. The polymerization process may produce toxic gases which is hardly to recycle due to adding plasticizers to affect quality of recycled plastic. If PVC is undergone a pyrolysis process, the toxic gases such as dioxin will be produced and volatilized into air, which is harmful to the environment and people's health.

SUMMARY OF THE INVENTION

According to the drawbacks from the related art, it is an object of the present invention to provide a composite thermoplastic film, which is a composite structure. Compared with PVC or PU in the prior art, the composite thermoplastic film has better elasticity, better resistance of high or low temperature and better compatibility with thermoplastic urethane (TPU).

It is another object of the present invention to provide a composite thermoplastic film, the tactile sense of the composite thermoplastic film is similar to polyvinyl chloride, which has wear-resistance and better thermal stability. The manufacturing process of the composite thermoplastic film is environment-friendly, and the solvent is not need to be added as in the PU preparation process. Therefore, the composite thermoplastic film is environmental-friendly. The composite thermoplastic film is easy to vacuum shape and has a good resilience. Further, the overall structure of the composite thermoplastic film can be fully recycled and reused.

It is another object of the present invention to provide a manufacturing method of a composite thermoplastic film, which did not use the extrusion laminating in the manufacturing method, so the manufacturing process of the thermoplastic is environmental-friendly.

It is another object of the present invention to provide a composite thermoplastic film, a composite layer of the composite thermoplastic film is composed by thermoplastic olefin (TPO) and thermoplastic polyurethane, in which the thermoplastic olefin can provide better extension properties during molding. The thermoplastic urethane can provide tactile sense similar to polyvinyl chloride (PVC). After through the forming wheel or forming-embossing wheel, the composite thermoplastic film can have a variety of texture variability.

According to the above objectives, the present invention provides a composite thermoplastic film, in sequence from bottom to top comprising a first thermal fuse film, a second thermal fuse film, and a third thermal fuse film, in which a thickness of the first thermal fuse film and the third thermal fuse film ranges from 0.03 mm to 0.07 mm.

According to a preferred embodiment, the first thermal fuse film is thermoplastic olefin or thermoplastic polyurethane, and the second thermal fuse film is thermoplastic olefin.

According to the above objectives, the present invention provides a manufacturing method of a composite thermoplastic film, comprises: providing a first structural layer and a second structural layer; performing a co-extrusion step to form a composite layer, wherein the co-extrusion step comprises: performing the co-extrusion step with a first extruding machine, so the first structural layer is divided into a first thermal fuse film and a third thermal fuse film after passing through the first extruding machine; and performing the co-extrusion step with a second extruding machine, so the second structural layer is formed a second thermal fuse film after passing through the second extruding machine and is formed between the first thermal fuse film and the third thermal fuse film, thereby the first thermal fuse film, the second thermal fuse film and the third thermal fuse film are formed as a composite layer; and performing a film-forming step, wherein the composite layer is cooled to form a film through a forming wheel or a forming-embossing wheel, and controlling a rotating speed of the forming wheel or the forming-embossing wheel to obtain the composite thermoplastic film with a desired thickness.

According to another preferred embodiment, the manufacturing method further comprises: adding a coagent during the co-extrusion step, wherein the coagent is maleic anhydride-grafted polyolefin elastomer (POE-g-MA), maleic anhydride-grafted polypropylene (PP-g-MA), the maleic anhydride-grafted polyethylene (POE-g-MA) (1) with graft ratio ranges from 0.3% to 1% or maleic anhydride-grafted polyethylene (PP-g-MA) (2) with graft ratio ranges from 0.3% to 1%.

According to another preferred embodiment, in which a weight concentration of the coagent is 5% of a total weight concentration of the first structural layer and the second structural layer.

According to another preferred embodiment, in which a melting point of the first structural layer ranges from 120° C. to 160° C., a softness and hardness of the first structural layer ranges from 60 Å to 90 Å, a melting point of the second structural layer ranges from 60° C. to 160° C. and a softness and hardness of the second structural layer ranges from 60 Å to 90 Å.

According to another preferred embodiment, in which the first extruding machine and the second extruding machine have several temperature sections.

According to another preferred embodiment, in which the first extruding machine and the second extruding machine have at least three temperature sections, and each of the temperature sections ranges from180° C. to 190° C., 200° C. to 205° C. and 200° C. to 205° C.

According to another preferred embodiment, in which temperatures of T-Dies of each of the first extruding machine and the second extruding machine ranges from 170° C. to 185° C.

According to another preferred embodiment, in which the first structural layer is thermoplastic olefin or thermoplastic polyurethane, and the second structural layer is thermoplastic olefin.

According to the above objective, the present invention further provides a composite thermoplastic film, from top to bottom includes a first thermal fuse film, a second thermal fuse film and a third thermal fuse film, and thickness of the first thermal fuse film and the third thermal fuse film range in 0.03 mm to 0.07 mm.

DETAILED DESCRIPTION OF THE PREFERRED EMBODIMENT

Figure 1:
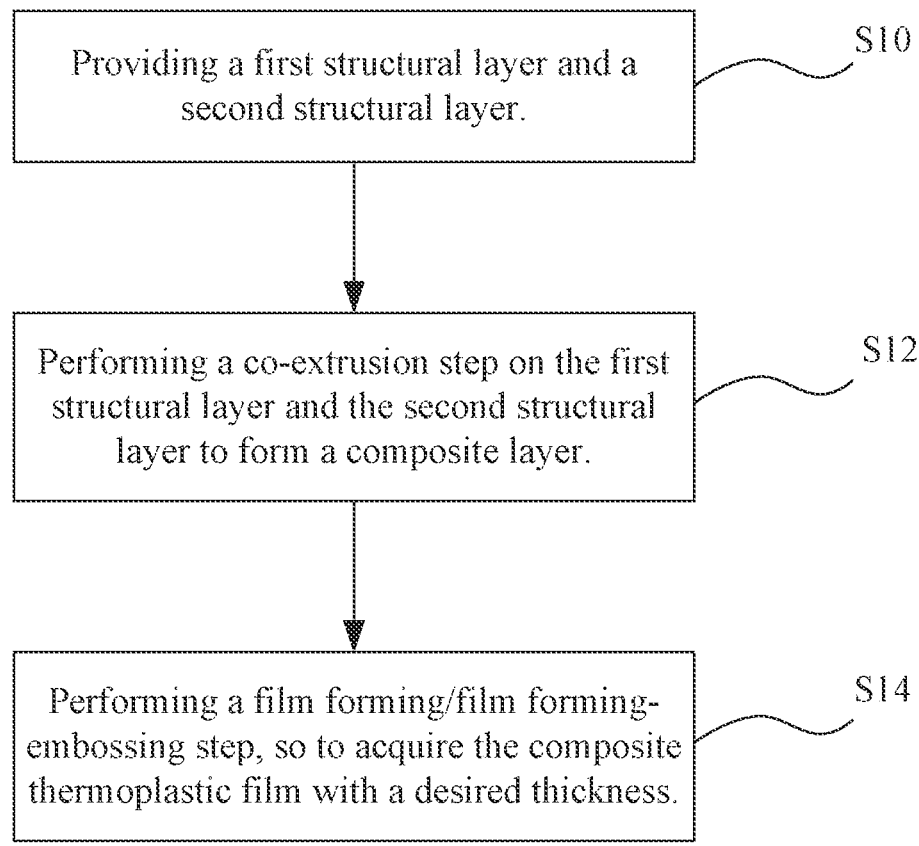
FIG. 1 is a manufacturing method flow chart of a composite thermoplastic film in accordance with the present invention.

First, please refer to FIG. 1. FIG. 1 is a manufacturing method flow chart of a composite thermoplastic film in accordance with the present invention. In FIG. 1, step S10: Providing a first structural layer and a second structural layer. In this step, a melting point of the first structural layer ranges from 120° C. to 160° C., a preferred melting point ranges from 120° C. to 130° C., a softness and hardness of the first structural layer ranges from 60 Å to 90 Å, and a preferred softness and hardness ranges from 70 Å to 80 Å. A melting point of the second structural layer ranges in in 60° C. to 160° C., a preferred melting point ranges in 100° C. to 110° C., a softness and hardness of the second structural layer ranges in 60 Å to 90 Å, and a preferred softness and hardness ranges in 60 Å to 70 Å. In an embodiment of the present invention, the first structural layer is thermoplastic olefin or thermoplastic polyurethane, and the second structural layer is thermoplastic olefin.

Next, step S12: performing a co-extrusion step on the first structural layer and the second structural layer to form a composite layer. In this step, a first extruding machine is used to perform the co-extrusion step is performed with a first extruding machine to the first structural layer to divide into two fluids after passing through the first extruding machine, in which one fluid is a first thermal fuse film and the other fluid is a third thermal fuse film. The co-extrusion step is performed with a second extruding machine to the second structural layer to form a second thermal fuse film, and the second thermal fuse film is formed between the first thermal fuse film and the third thermal fuse film which extruded by the first extruding machine to form the composite layer. It should be noted that the co-extrusion steps of the first extruding machine and the second extruding machine are carried out simultaneously. That is, when the first structural layer is put into the first extruding machine to separately extrude the first thermal fuse film and the third thermal fuse film, the structural layer is put into the second extruding machine to extrude a second thermal fuse film at the same time, and the second thermal fuse film is in the middle of the first thermal fuse film and the third thermal fuse film to form a composite layer. In this embodiment, the first extruding machine and the second extruding machine have several temperature sections. In the embodiment of the present invention, the first extruding machine and the second extruding machine have at least three temperature sections, and each of the temperature sections ranges from 180° C. to 190° C., 200° C. to 205° C. and 200° C. to 205° C. respectively.

In addition, temperatures of T-Die of each of the first extruding machine and the second extruding machine ranges from 170° C. to 185° C. A preferred temperature of T-Die ranges from 170° C. to 175° C. and another preferred temperature of T-Die ranges from 180° C. to 185° C. It is necessary to point out that this step (step S12), the adjustment of the thickness of the composite layer after co-extrusion step is that the first structural layer and the second structural layer are respectively put into the first extruding machine and the second extruding machine to control the rotational speeds, linear velocities, or temperature of each temperature sections of the first extruding machine and the second extruding machine and T-Die temperature.

Furthermore, when the step S12 is performed, a coagent is further added in the co-extrusion step of the first extruding machine and the second extruding machine to increase adhesive strength of each layer between the composite layers, in which the coagent can be maleic anhydride-grafted polyolefin elastomer (POE-g-MA), maleic anhydride-grafted polypropylene (PP-g-MA), maleic anhydride-grafted polyethylene (PE-g-MA) (1) with graft ratio ranged from 0.3% to 1% or maleic anhydride-grafted polyethylene (PE-g-MA) (2) with graft ratio ranges from 0.3% to 1% . In another preferred embodiment, the coagent can be maleic anhydride-grafted polyethylene (PE-g-MA) (2) with graft ratio ranges from 0.5% to 1%, and weight concentration of the coagent is 5% of a total weight concentration of the first structural layer and the second structural layer.

Next, step S14: Performing a film forming/film forming-embossing step to obtain the composite thermoplastic film with a desired thickness. In this step, the composite layer formed by step S12 described above is cooled with the forming wheel or the forming embossing wheel to form a film, in which the rotational speed of the forming wheel/forming-embossing wheel ranges from 8 M/min to 12 M/min, and temperature of the forming wheel/forming-embossing wheel ranges from 15° C. to 30° C. Accordingly, the film-forming thickness of the composite thermoplastic film with a desired thickness can be adjusted.

Figure 2:
FIG. 2 is a cross-sectional view of the composite thermoplastic film formed by the manufacturing method flow chart depicted in FIG. 1.
Figure 2:
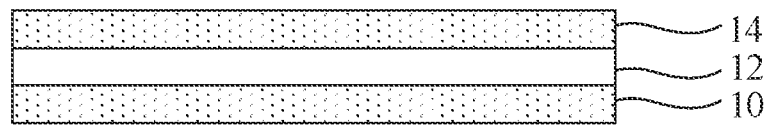

Please refer to FIG. 2. FIG. 2 is a cross-section view of a composite thermoplastic film formed by the manufacturing method flow chart depicted in FIG. 1. In FIG. 2, a composite thermoplastic film 1 is manufactured according to step S10 to S14 describe above, and the physical properties will not be repeated herein. The composite thermoplastic film 1 from bottom to top in sequence includes a first thermal fuse film 10, a second thermal fuse film 12 and a third thermal fuse film 14, in which thickness of the first thermal fuse film 10 and the thermal fuse film 14 range from 0.03 mm to 0.07 mm. In the embodiment of the present invention, the composite thermoplastic film 1 can be applied to vacuum forming materials.

According to the manufacturing method flow chart in FIG. 1, the following embodiments are presented to illustrate the present invention.

Embodiment 1

The first structural layer is thermoplastic polyurethane (TPU) and the second structural layer is thermoplastic olefin (TPO). The three temperature sections of the first extruding machine and the second extruding machine are respectively set to 190° C., 205° C. and 205° C. in sequence, and the temperature range of the T-Dies are set to 170° C.-185° C. To adjust the speed at which the first structural layer and the second structure layer are put into the first extruding machine and the second extruding machine, so that the thickness of the composite layer formed by the first extruding machine and the second extruding machine can be controlled within 0.33 mm to 0.35 mm. Then the temperature ranges of the forming wheel/forming-embossing wheel is set at 15° C. to 20° C. and the rotational speed of the forming wheel/forming-embossing wheel is set at 8 M/min to 12 M/min, to obtain the composite thermoplastic film 1.

Embodiment 2

The first structural layer and the second structural layer are both thermoplastic olefin (TPO). The three temperature sections of the first extruding machine and the second extruding machine are respectively set to 180° C., 200° C. and 200° C. in sequence, and the temperature range of the T-Dies are set to 170° C.-175° C. To adjust the speed at which the first structural layer and the second structure layer are put into the first extruding machine and the second extruding machine, so that the thickness of upper layer and lower layer (i.e., the first fused film and the third fused film extruded by the first extruding machine) of the composite layer formed by the first extruding machine can be controlled within 0.33 mm to 0.35 mm. Then the temperature ranges of the forming wheel/forming-embossing wheel is set at 15° C. to 20° C. and the rotational speed of the forming wheel/forming-embossing wheel is set at 8 M/min to 12 M/min, to obtain the composite thermoplastic film 1

Embodiment 3

The first structural layer is thermoplastic polyurethane (TPU) and the second structural layer is thermoplastic olefin (TPO). The three temperature sections of the first extruding machine are sequentially set to 180° C., 200° C. and 200° C., the second extruding machine is sequentially set to 180° C., 205° C. and 200° C., and the temperature range of the T-Dies are set to 180° C.-185° C. To adjust the speed at which the first structural layer and the second structure layer are put into the first extruding machine and the second extruding machine, so that the thickness of the upper layer and the lower layer (i.e., the first fused film and the third fused film extruded by the first extruding machine) of the composite layer formed by the first extruding machine can be controlled within 0.05 mm to 0.07 mm. Then the temperature of the forming wheel/forming-embossing wheel is set at 20° C. to 30° C. and the rotational speed of the forming wheel/forming-embossing wheel is set at 8 M/min to 12 M/min, to obtain the composite thermoplastic film 1

Embodiment 4

The first structural layer is thermoplastic polyurethane (TPU) and the second structural layer is thermoplastic olefin (TPO). The three temperature sections of the first extruding machine are sequentially set to 180° C., 200° C. and 200° C., the three temperature sections of the second extruding machine are sequentially set to 180° C., 205° C. and 200° C., and the temperature range of the T-Dies are set to 180° C.-185° C. To adjust the speed at which the first structural layer and the second structure layer are put into the first extruding machine and the second extruding machine, so that the thickness of the upper layer and the lower layer (i.e., the first fused film and the third fused film extruded by the first extruding machine) of the composite layer formed by the first extruding machine can be controlled within 0.03 mm to 0.05 mm. Then the temperature of the forming wheel/forming-embossing wheel is set at 20° C. to 30° C. and the rotational speed of the forming wheel/forming-embossing wheel is set at 8 M/min to 12 M/min, to obtain the composite thermoplastic film 1.

In addition, the present invention further uses thermoplastic elastomer (TPE) as the top layer and the bottom layer of the composite thermoplastic film, and a middle layer of the composite thermoplastic film is thermoplastic olefin as a reference sample. The reference sample is used as a comparison with the composite thermoplastic film 1 formed by Embodiment 1 to 4, in which the preparation of the reference sample is the same as the previous step S10 to step S14, and will not be repeated herein. The physical properties of the reference sample are shown in Table 1.

TABLE 1

| | Materials | Softness and hardness (Å) | Melting Point (° C.) | Thickness (mm) |
|---|---|---|---|---|
| upper layer, lower layer | TPE | 60-90 | 120-160 | 0.1-0.3 |
| middle layer | TPO | 60-90 | 60-160 | 0.1-0.3 |

The composite thermoplastic films 1 formed by above Embodiments 1 to 4 and the reference sample are respectively performed for tensile strength, extension rate and tear strength, and the results are shown in Table 2.

TABLE 2

| Materials | Test Method | Units | Embodiment 1 | Embodiment 2 | Embodiment 3 | Embodiment 4 | Reference Sample |
|---|---|---|---|---|---|---|---|
| Thickness | ASTM D1777 | mm | 0.35 | 0.35 | 0.35 | 0.35 | 0.5 |
| Weight | ASTM D751 | g/m² | 423 | 284 | 314 | 306 | 304 |

TABLE 2-continued

| Materials | Test Method | Units | | Embodiment 1 | Embodiment 2 | Embodiment 3 | Embodiment 4 | Reference Sample |
|---|---|---|---|---|---|---|---|---|
| Tensile Strength | ASTM D412C | Kg/6 mm | T | 7.2 | 3.5 | 4.0 | 2.7 | 2.2 |
|  |  |  | y | 6.8 | 3.3 | 3.8 | 2.6 | 2.0 |
| Extension Rate | ASTM D412C | % | T | 1141 | 560 | 441 | 451 | 350 |
|  |  |  | y | 1135 | 482 | 450 | 443 | 372 |
| Tear Strength | ASTM D624C | Kg | T | 3.5 | 2.1 | 2.5 | 1.5 | 1.7 |
|  |  |  | y | 3.2 | 2.0 | 2.5 | 1.5 | 1.6 |

The difference between Embodiment 1 and 2 is that the composite thermoplastic film in Embodiment 1 is composed of thermoplastic polyurethane and thermoplastic olefin, and the composite thermoplastic film in Embodiment 1 is composed of thermoplastic olefin. The different materials will affect the physical properties of the overall composite thermoplastic film.

The difference between Embodiment 3 and 4 is that the thickness of the top layer (the first thermal fuse film) and the bottom layer (the third thermal fuse film) ranges from 0.05 mm to 0.07 mm in Embodiment 3, and thickness of the top layer (the first thermal fuse film) and the bottom layer (the third thermal fuse film) ranges from 0.03 mm to 0.05 mm in Embodiment 4. Due to the thickness of each layers is different, the physical properties of the overall composite thermoplastic film will also be affected.

Embodiment 5 to Embodiment 8

The first structural layer is thermoplastic polyurethane (TPU) and the second structural layer is thermoplastic olefin (TPO). The three temperature sections of the first extruding machine are sequentially set to 180° C., 200° C. and 200° C., the three temperature sections of the second extruding machine are sequentially set to 180° C., 205° C. and 200° C., and the temperature range of the T-Dies are set to 180° C.-185° C. To adjust the speed at which the first structural layer and the second structure layer are put into the first extruding machine and the second extruding machine, and to add different kinds of coagents simultaneously, so that the thickness of upper layer and lower layer (i.e., the first fused film and the third fused film extruded by the first extruding machine) of the composite layer formed by the first extruding machine can be controlled within 0.05 mm to 0.07 mm. Then the temperature of the forming wheel/forming-embossing wheel is set at 20° C. to 30° C. and the rotating speed of the forming wheel/forming-embossing wheel is set at 8 M/min to 12 M/min, to obtain the composite thermoplastic film 1. The coagents used in Embodiments 5 to 8 are shown in Table 3.

TABLE 3

| coagent | short version | Complete term |
|---|---|---|
| A | POE-g-MA | maleic anhydride-grafted polyolefin elastomer |
| B | PP-g-MA | maleic anhydride-grafted polypropylene |
| C | PE-g-MA(1) | maleic anhydride-grafted polyethylene (1) with graft ratio ranged from 0.3% to 1% |
| D | PE-g-MA(2) | maleic anhydride-grafted polyethylene (2) with graft ratio ranged from 0.3% to 1% |

The composite thermoplastic films are subjected to a peel strength test before and after hydrolysis reaction, and the results are shown in Table 4.

TABLE 4

|  | TPU (%) | TPO (%) | coagents A (%) | coagents B (%) | coagents C (%) | coagents D (%) | peel strength before hydrolysis (Kg/cm) | peel strength after hydrolysis (Kg/cm) |
|---|---|---|---|---|---|---|---|---|
| Embodiment 3 | 100 | 0 |  |  |  |  | 4.2 | 2.3 |
| Embodiment 4 | 100 | 0 |  |  |  |  | 4.1 | 2.4 |
| Embodiment 5 | 95 | 5 | 5 |  |  |  | 2.9 | 2.4 |
| Embodiment 6 | 95 | 5 |  | 5 |  |  | 4.6 | 4.3 |
| Embodiment 7 | 95 | 5 |  |  | 5 |  | 2.3 | 1.1 |
| Embodiment 8 | 95 | 5 |  |  |  | 5 | 2.2 | 1.2 |

According to the above description, the different kinds of coagents added in co-extrusion step will affect the peel strength of each layer between the composite thermoplastic film.

What is claimed is:

1. A manufacturing method of a composite thermoplastic film, comprising:
   providing a first structural layer and a second structural layer;
   performing a co-extrusion step to form a composite layer, wherein the co-extrusion step comprises:
   performing the co-extrusion step with a first extruding machine, so the first structural layer is divided into a first thermal fuse film and a third thermal fuse film after passing through the first extruding machine; and
   performing the co-extrusion step with a second extruding machine, so the second structural layer is formed a second thermal fuse film after passing through the second extruding machine and is formed between the first thermal fuse film and the third thermal fuse film, thereby the first thermal fuse film, the second thermal fuse film and the third thermal fuse film are formed as a composite layer; and
   performing a film-forming step, wherein the composite layer is cooled to form a film through a forming wheel or a forming-embossing wheel, and controlling a rotating speed of the forming wheel or the forming-embossing wheel to obtain the composite thermoplastic film with a desired thickness.

2. The manufacturing method of claim 1, further comprises:
   adding a coagent during the co-extrusion step, wherein the coagent is maleic anhydride- grafted polyolefin elastomer (POE-g-MA), maleic anhydride-grafted polypropylene (PP-g-MA), the maleic anhydride-grafted polyethylene (POE-g-MA) (1) with graft ratio ranges from 0.3% to 1% or maleic anhydride-grafted polyethylene (PP-g-MA) (2) with graft ratio ranges from 0.3% to 1%.

3. The manufacturing method of claim 2, wherein a weight concentration of the coagent is 5% of a total weight concentration of the first structural layer and the second structural layer.

4. The manufacturing method of claim 1, wherein a melting point of the first structural layer ranges from 120° C. to 160° C., a softness and hardness of the first structural layer ranges from 60 Å to 90 Å, a melting point of the second structural layer ranges from 60° C. to 160° C. and a softness and hardness of the second structural layer ranges from 60 Å to 90 Å.

5. The manufacturing method of claim 1, wherein the first extruding machine and the second extruding machine have several temperature sections.

6. The manufacturing method of claim 5, wherein the first extruding machine and the second extruding machine have at least three temperature sections, and each of the temperature sections ranges from 180° C. to 190° C., 200° C. to 205° C. and 200° C. to 205° C.

7. The manufacturing method of claim 1, wherein temperatures of T-Dies of each of the first extruding machine and the second extruding machine ranges from 170° C. to 185° C.

8. The manufacturing method of claim 1, wherein the first structural layer is thermoplastic olefin or thermoplastic polyurethane, and the second structural layer is thermoplastic olefin.

* * * * *